Figure 1:
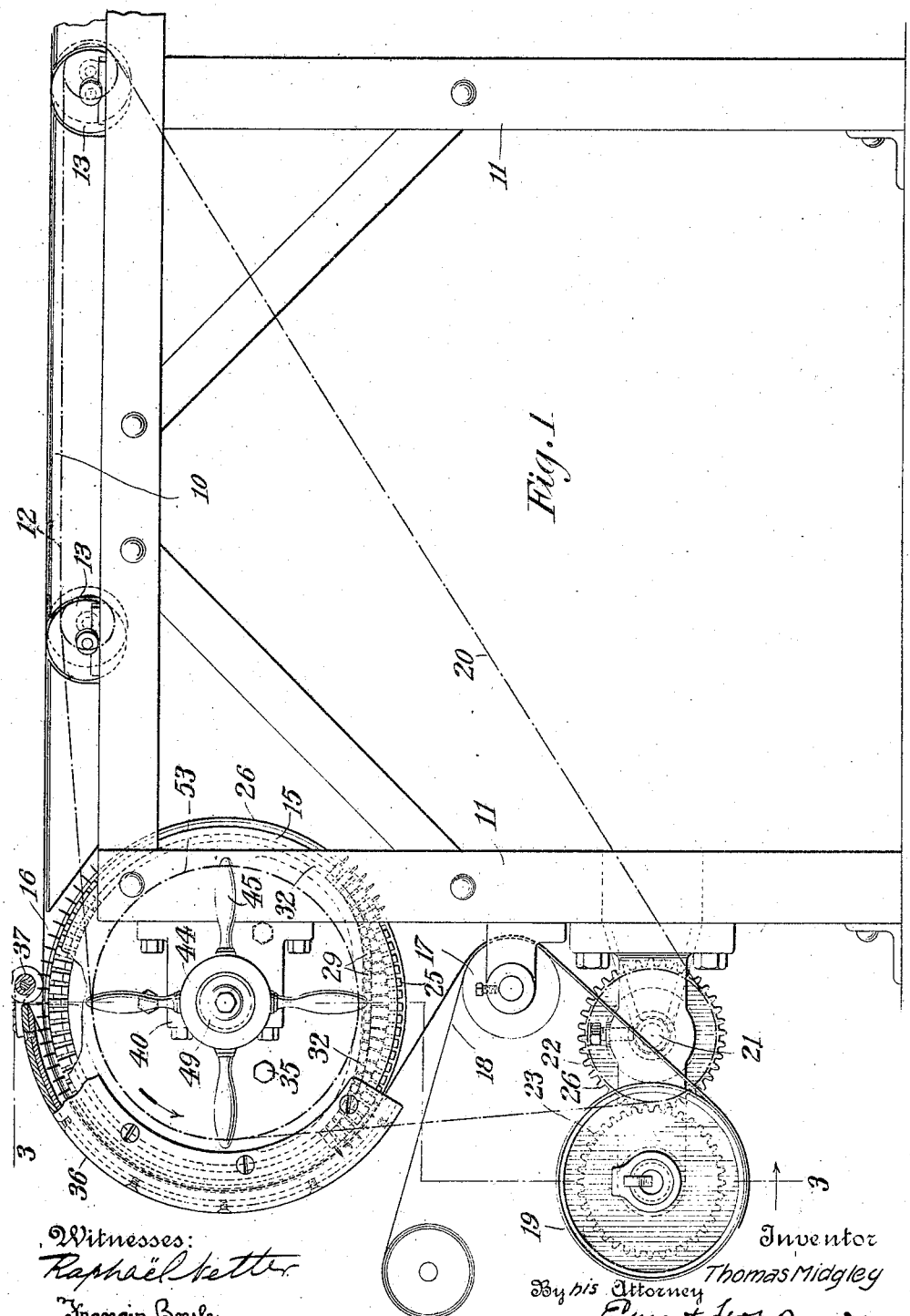

T. MIDGLEY.
FABRIC STRETCHING MACHINE.
APPLICATION FILED MAR. 18, 1914.

1,161,950.

Patented Nov. 30, 1915.
3 SHEETS—SHEET 1.

Witnesses:
Raphaël Netter
Francis Boyle

Inventor
Thomas Midgley
By his Attorney
Ernest Hopkinson

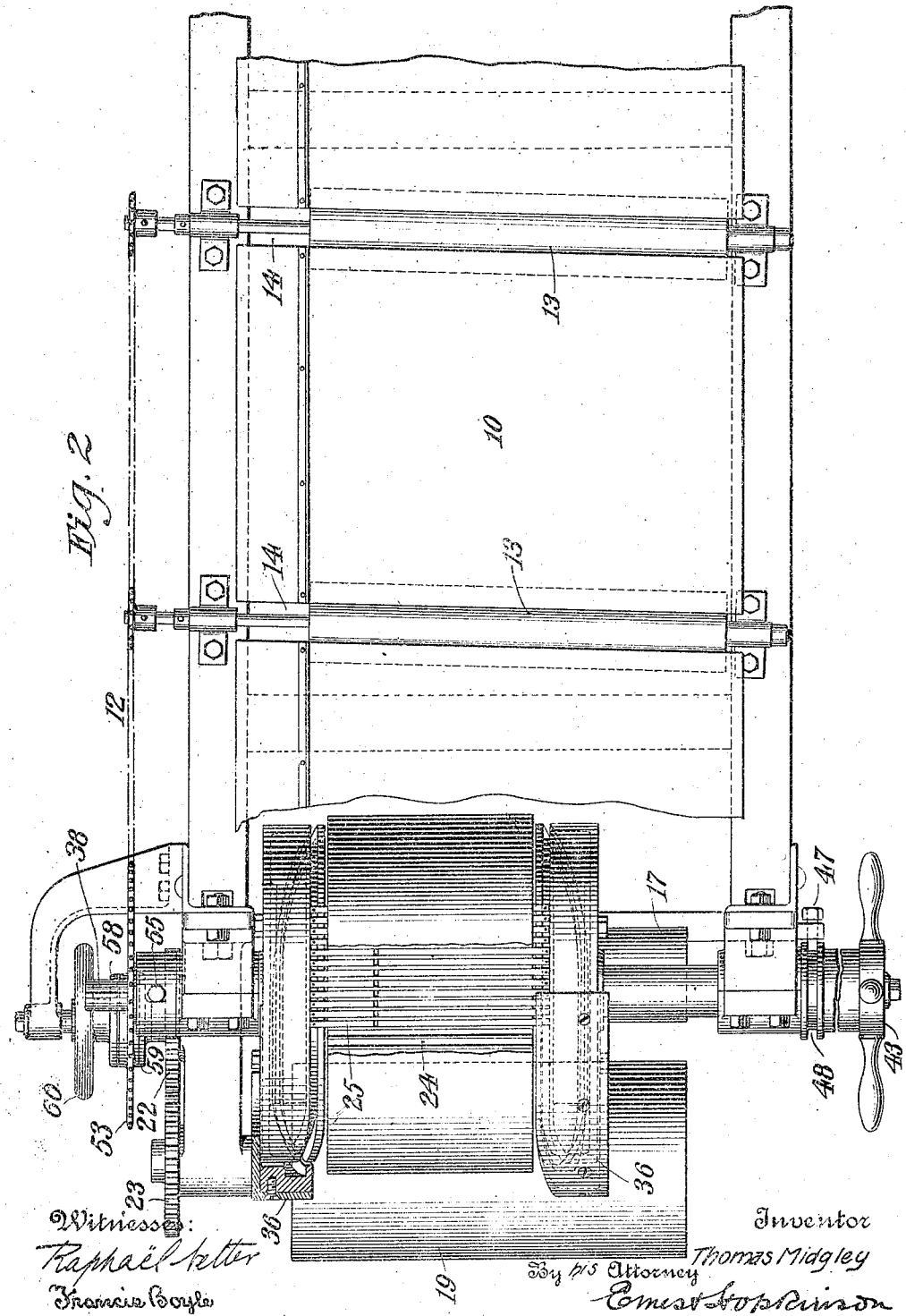

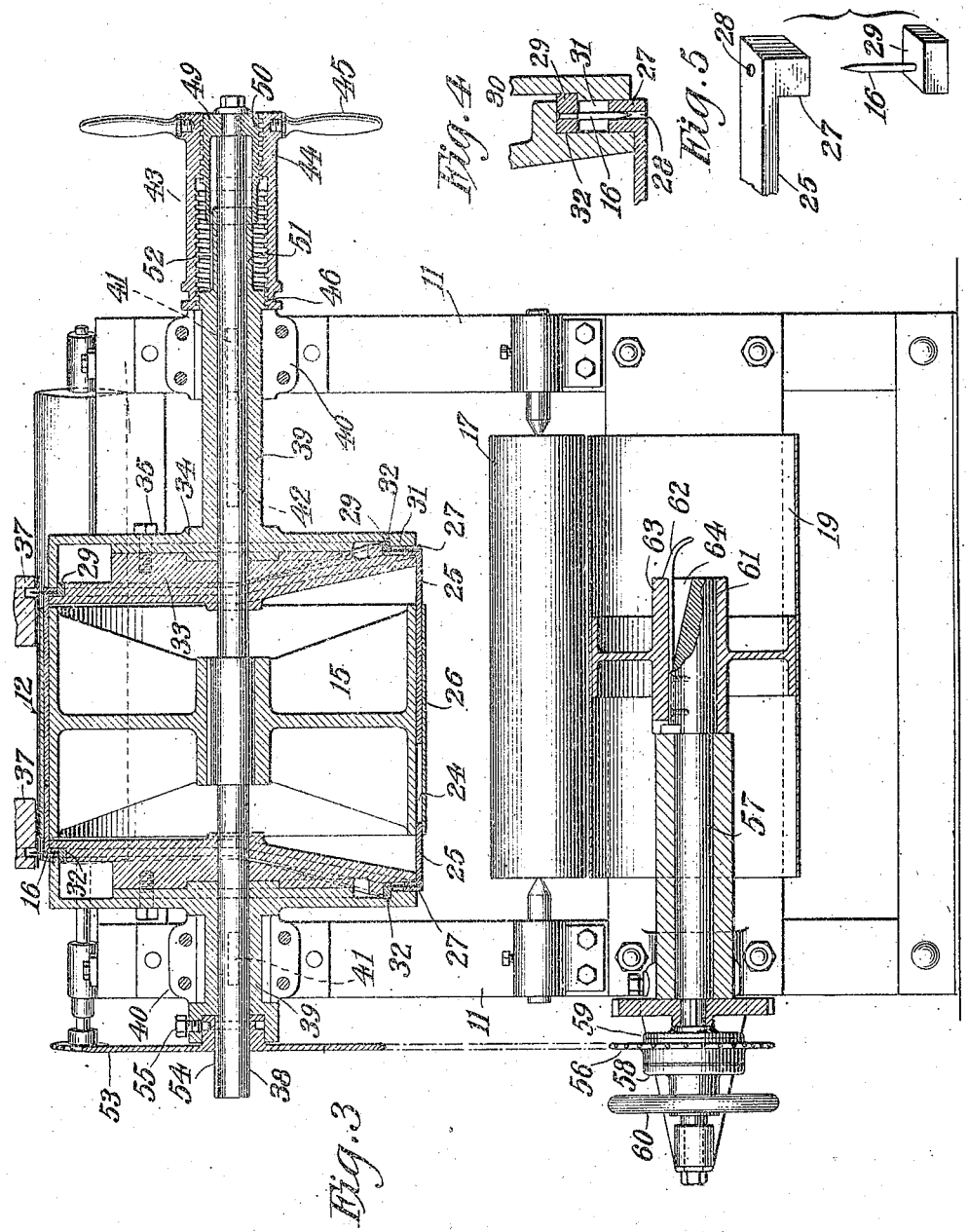

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

FABRIC-STRETCHING MACHINE.

1,161,950.  Specification of Letters Patent.  Patented Nov. 30, 1915.

Application filed March 18, 1914. Serial No. 825,484.

*To all whom it may concern:*

Be it known that I, THOMAS MIDGLEY, a citizen of the United States, residing in Worthington, county of Franklin and State of Ohio, have invented certain new and useful Improvements in Fabric-Stretching Machines, of which the following is a full, clear, and exact description.

This invention relates to the manufacture of pre-stretched woven fabric which is designed more particularly for use in pneumatic tires.

In the manufacture of tires, it is customary to employ flat strips of woven fabric cut on the bias, these fabric strips during the operation of building up the tire, requiring considerable distortion to shape them to the configuration of the tire.

My invention provides a process for imparting a permanent transverse stretch to the fabric prior to its application to the tire, thereby imparting to it a greater capacity for more readily partaking of the contour of the tire than is inherent in the normal fabric, and compensating for the longitudinal stretch when the fabric is applied to the core or form under longitudinal tension in building the carcass, thereby permitting the fabric to be laid on with the correct angle between the strands or threads of fabric preserved.

My invention further provides novel apparatus for changing the angular relation of the warp and weft threads in woven fabric from their original angular relation and for spooling the product for subsequent use.

In the drawing I have shown a form of apparatus which is suitable for use in practising my invention, in which drawing—

Figure 1 is a side elevation of the machine; Fig. 2 is a plan view thereof; Fig. 3 is a sectional view on the line 3—3 in Fig. 1; Fig. 4 is a detailed sectional view showing one of the stretching devices; Fig. 5 is a detailed perspective view showing one of the stretching devices.

Referring now to the drawing, the machine briefly comprises a feed table 10 which is supported upon suitable legs 11. The sheets of fabric 12 supported by the table, are advanced to the delivery end of the latter by frictional engagement with feed rolls 13 which project partially through transverse slots 14 in the table. The rolls 13 are disposed obliquely across the table to force the fabric against a guide-strip as shown and thereby properly centralize the fabric for delivery to the stretching drum. At the delivery end of the table a revoluble drum 15 is disposed in the path of the fabric and carries near the ends rows of radially extending pins 16, which penetrate the marginal edge portions of the fabric and advance the fabric over the drum. The rows of pins have spreading apart movement with respect to each other while engaging the fabric whereby the fabric is stretched transversely. The rows of pins also have radial movement with respect to the drum, succeeding their spreading apart movement, whereby they are withdrawn and release the stretched fabric. The stretched fabric passes from the drum over and frictionally drives an idle roll 17, where it is supplied with a ribbon of backing material 18, and finally is spooled upon a driven stock-roll 19 for subsequent use. The feed rolls and drum are driven by a common chain-drive 20 from a drive-shaft 21 and the stock-roll is driven from the drive-shaft by meshing gears 22 and 23.

The stretching drum constitutes a highly important element of the apparatus since the fabric has imparted thereto a permanent transverse stretch while passing thereover. In detail, the drum is formed with transverse peripheral grooves 24 that open through the side faces of the drum, each groove receiving and forming a guide-way for a pair of bars 25 placed end to end and simultaneously movable in opposite directions therein. A band 26 encircles the drum circumferentially and retains the bars in the guide-ways. Each bar projects at the outer end beyond the corresponding side face of the drum and terminates in a lug 27 which extends radially toward the axis of the drum and is formed with an orifice 28 which slidably receives one of the above-mentioned pins 16, said pin having a block-head 29 which confronts the end face of the lug.

A non-rotatable cam 30 at each side of the drum operates the corresponding row of bars and their pins, each cam being formed with a peripheral cam-slot 31, which receives the lugs of the bars and shifts the bars laterally during rotation of the drum; and with an internal cam-slot 32 which receives the heads of the pins and moves the pins radially during rotation of the drum. To facilitate the formation of these slots each cam is preferably formed of two mating halves 33 and 34 bolted together as shown at 35.

The relative configurations of the slots in the cams are such that the rows of pins gradually diverge with respect to each other after engaging the fabric and stretch the fabric laterally during its passage over the upper side of the drum, and are then withdrawn from the stretched fabric radially to free the fabric for unobstructed passage off the drum. During this transverse stretching of the fabric the relative angular relation of the warp and weft threads will be changed from their normal relation due to the fabric being foreshortened in length and proportionately increased in width.

Each cam is equipped with a flange 36 which houses the corresponding row of pins, there being a circumferentially grooved roller 37 mounted on the flange to receive the pins in its groove, the roller bearing down upon the related edge portion of the fabric and forming an abutment therefor to promote the pins penetrating the fabric without tearing as the fabric arrives at the drum from the feed table.

I do not limit myself to pins as the stretching agent, equivalents being possible. Except when expressly specified in the claims, I do not limit myself to cams for operating the stretching agent, nor to the more particular construction of the drum mentioned, it being only essential to the practice of the invention that the fabric be engaged and stretched laterally to permanently change the normal angular relation of the warp and weft threads.

The shaft 38 of the drum is journaled in hubs 39 formed integral with the cams 30, these hubs being non-rotatably mounted in boxes 40 on the legs of the table, one of the hubs being keyed to its respective box as shown at 41 and the other being feathered for sliding movement in its box as shown at 42 for a purpose which will now be explained. In order to adjust the apparatus to accommodate various widths of fabrics, I employ an adjusting device indicated at 43, which comprises a sleeve 44 provided with a hand-wheel 45 and having a screw-thread connection 46 with the feathered hub above mentioned, the sleeve being anchored to the table by a pin 47 working in a groove 48 on the sleeve. A cap 49 is turnably mounted on the end of the drum-shaft and has a screw-threaded connection 50 with the sleeve, of one-half the pitch of the thread connection between the sleeve and hub, the cap being feathered to slide on a reduced nipple 51 integral with said hub, as shown at 52.

Rotation of the hand-wheel serves to shift the shiftable cam laterally the desired distance and at the same time shift the drum-shaft laterally one-half this distance to center the drum relative to the cams. To provide for shifting of the drum-shaft without interfering with its rotation by the chain drive, the shaft is feathered to slide through its drive sprocket 53 as shown at 54, the sprocket being journaled in the hub of the stationary cam and held against sliding movement by a pin 55.

To provide against increasing the tension of the fabric as the convolutions increase in diameter on the stock roll, the drive sprocket 56 of the stock roll shaft 57 is loosely confined on the shaft between friction disks 58 and 59, one of which is shiftable through the instrumentality of a hand-wheel 60 to regulate the friction exerted by the disk upon the sprocket. As the fabric accumulates on the stock roll, the drive sprocket slips between the friction disks to such an extent that rotation will be imparted to the stock roll without increasing the tension of the fabric. The stock roll is feathered on the shaft as shown at 61 and is mounted for removal therefrom when full by means of a spring latch 62 carried longitudinally by the shaft and hooking over the end of the hub 63 of the roll, the shaft having a recess 64 underneath the latch to permit of the latch being depressed thereinto for releasing the stock roll for removal.

In operation, a strip of fabric cut on the bias is placed on the feed table, and the machine is then set in operation. Thereupon the feed rolls advance the fabric to the drum where it is seized at the edge portions by the stretching pins. The rotation of the drum and the pins carried thereby advances the fabric over the upper side of the drum, the rows of pins simultaneously and gradually moving apart during the progress of the fabric over the drum and imparting a permanent transverse stretch to the fabric. The rows of pins release the fabric when it arrives at the under side of the drum, the stretched fabric being then drawn on to and around the stock roll and passing over an idle roll on the way to the stock roll where it is supplied to a ribbon of backing material which separates the convolutions of the fabric on the stock roll.

Having thus described my invention, what I claim and desire to have protected by Letters Patent is:

1. A machine for pre-stretching fabric embodying a support for the fabric, pins for engaging the lateral edge portions of the fabric, and means for moving the pins radially and laterally.

2. A machine for pre-stretching the fabric embodying a support for the fabric, pins for engaging the lateral edge portions of the fabric movable in diverging paths, and means for withdrawing the pins radially from the fabric at the end of their diverging movement.

3. A machine for pre-stretching fabric embodying a support for the fabric, oppositely disposed pins for engaging the lateral edge portions of the fabric, and cams for moving the pins radially and laterally.

4. A machine for pre-stretching fabric embodying a support for the fabric, pins for engaging the lateral edge portions of the fabric and moving the fabric upon the support, and cams directing said pins laterally in diverging paths and then radially during the progress of the fabric upon the support.

5. A machine for pre-stretching fabric embodying a revoluble support for the fabric, pins carried thereby for engaging the lateral edge portions of the fabric, and cams directing the pins laterally in diverging paths during a portion of the rotation of the support, and then withdrawing the pins radially during a succeeding portion of the rotation of the support.

6. A machine for pre-stretching fabric embodying a revoluble support for the fabric, pins for engaging the lateral edge portions of the fabric, mounted on the support for lateral and radial movements, and stationary cams for moving the pins.

7. A machine for pre-stretching rubber treated fabric cut on the bias embodying a support for the fabric, a driven take-up roll for the fabric, pins for engaging the lateral edge portions of the fabric and advancing the same over the support to the take-up roll, and cams for moving the pins laterally in diverging paths and then radially during the progress of the fabric over the support, to permanently change the normal angular relation of the warp and weft threads of the fabric.

8. A machine for pre-stretching fabric embodying a feed table for the fabric, a revoluble stretching drum at the delivery end of the table, pins carried by the drum for engaging the lateral edge portions of the fabric and advancing the same over the drum, cams for directing the pins laterally in diverging paths and then radially during the progress of the fabric over the drum, and a take-up roll for receiving the fabric from the drum.

9. In a machine for pre-stretching fabric, a revoluble drum, opposed bars carried by the drum mounted for lateral movement thereon, means for engaging the edge portions of the fabric mounted on the bars for radial movement, and non-revoluble cams for engaging the bars and moving the same gradually in opposite directions from each other and moving said means radially on the bars.

Signed at Detroit, county of Wayne, State of Michigan, this 13th day of March, 1914.

THOMAS MIDGLEY.

Witnesses:
E. LA BUSCHEWSKY,
J. H. SWIFT.